United States Patent [19]

Fraser et al.

[11] Patent Number: 4,855,583

[45] Date of Patent: Aug. 8, 1989

[54] STRUCTURE AND METHOD OF MAKING COMBINATION PROXIMITY/INSERTION IDENTIFICATION CARDS

[75] Inventors: Steven A. Fraser, Saugus; David E. Johnston, Northridge; Reece D. Metzger, Studio City, all of Calif.

[73] Assignee: Figgie International, Inc., Willoughby, Ohio

[21] Appl. No.: 86,061

[22] Filed: Aug. 17, 1987

[51] Int. Cl.[4] ............................................. G06K 19/06
[52] U.S. Cl. ................................... 235/492; 235/440; 235/441; 235/449; 235/488; 235/493
[58] Field of Search ............... 235/440, 441, 449, 450, 235/492, 493, 488

[56] References Cited

U.S. PATENT DOCUMENTS

| | | |
|---|---|---|
| 2,774,060 | 12/1956 | Thompson . |
| 3,453,598 | 7/1969 | Schweizer . |
| 3,493,955 | 2/1970 | Minasy . |
| 3,521,280 | 7/1970 | Janco et al. . |
| 3,671,721 | 6/1972 | Hunn et al. . |
| 3,686,479 | 8/1972 | Rogers et al. .................. 235/450 |
| 3,707,711 | 12/1972 | Cole et al. . |
| 3,713,133 | 1/1973 | Nathans . |
| 3,714,980 | 12/1987 | Hara .................. 235/492 X |
| 3,732,465 | 5/1973 | Palmer . |
| 3,811,977 | 5/1974 | Kramer . |
| 3,863,244 | 1/1975 | Lichtblau . |
| 3,967,161 | 6/1976 | Lichtblau . |
| 4,021,705 | 5/1977 | Lichtblau . |
| 4,180,207 | 12/1979 | Lee .................. 235/450 X |
| 4,215,342 | 7/1980 | Horowitz . |
| 4,353,064 | 10/1982 | Stamm . |
| 4,369,557 | 1/1983 | Vandebult . |
| 4,384,288 | 5/1983 | Walton . |
| 4,388,524 | 6/1983 | Walton . |
| 4,455,484 | 6/1984 | Whitehead .................. 235/450 X |
| 4,506,148 | 3/1985 | Berthold et al. . |
| 4,527,152 | 7/1985 | Scarr et al. . |
| 4,546,241 | 10/1985 | Walton . |
| 4,568,936 | 2/1986 | Goldman . |
| 4,587,413 | 5/1986 | Hoppe et al. . |
| 4,684,791 | 8/1987 | Bito .................. 235/492 X |

*Primary Examiner*—David L. Trafton
*Attorney, Agent, or Firm*—Knobbe, Martens, Olson & Bear

[57] ABSTRACT

An identification card contains retrievable identification data in at least two formats. One format comprises a magnetic material that stores magnetically encoded data. Another format comprises electronic circuitry that stores electronically encoded data. The magnetically encoded data on the card may be retrieved by inserting the identification card into a reader having magnetic sensors. The electronically encoded data on the card may be transmitted from the card as a radio frequency signal that incorporates the data, to a remote sensor that receives and processes the radio frequency, data encoded signal. A structure for the identification card comprising these two data storage formats as well as a method of producing such an identification card is described.

26 Claims, 3 Drawing Sheets

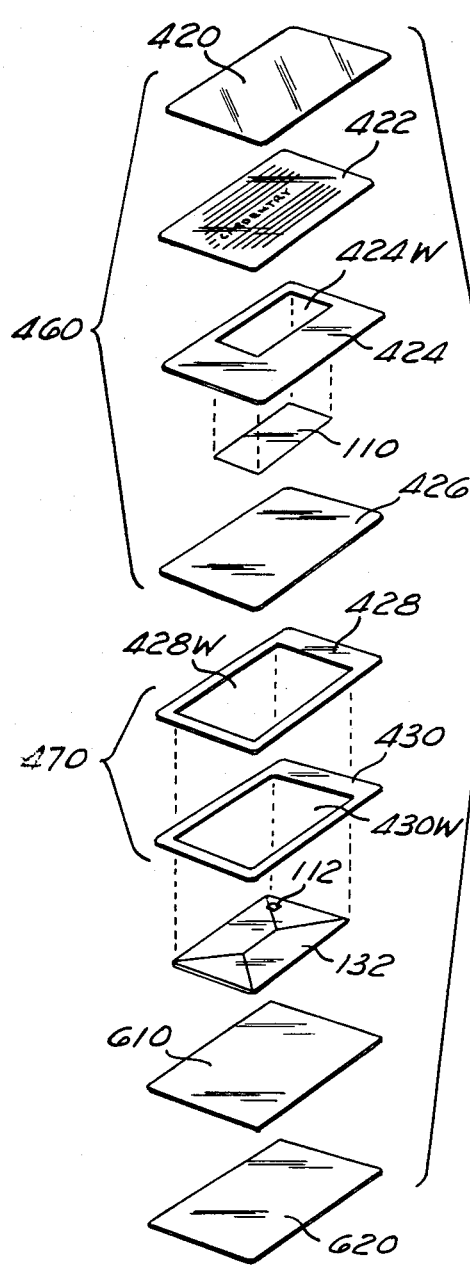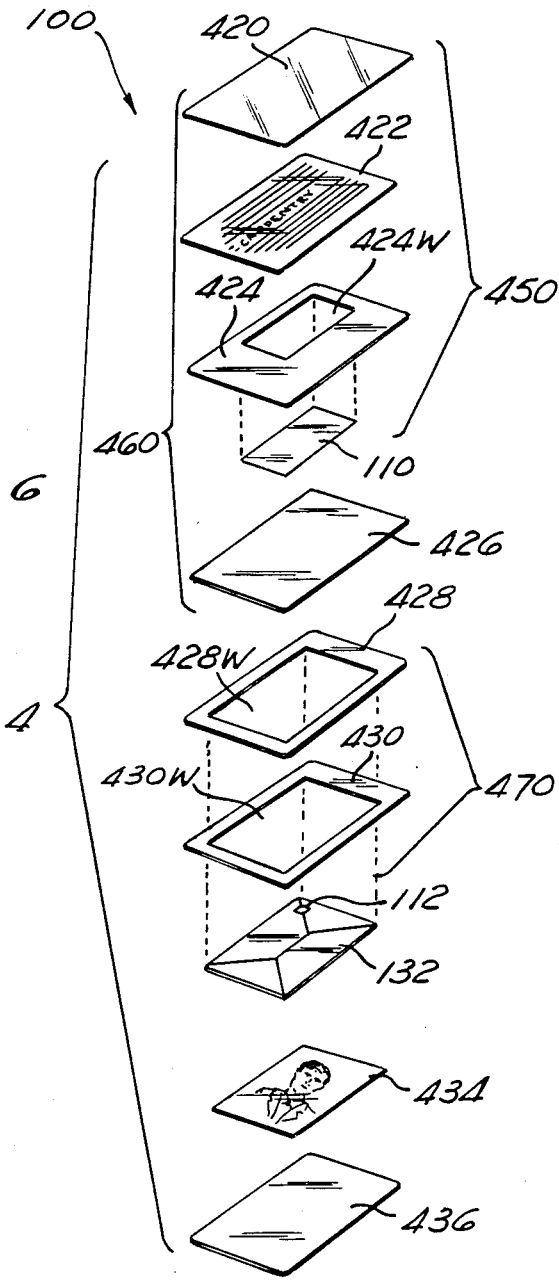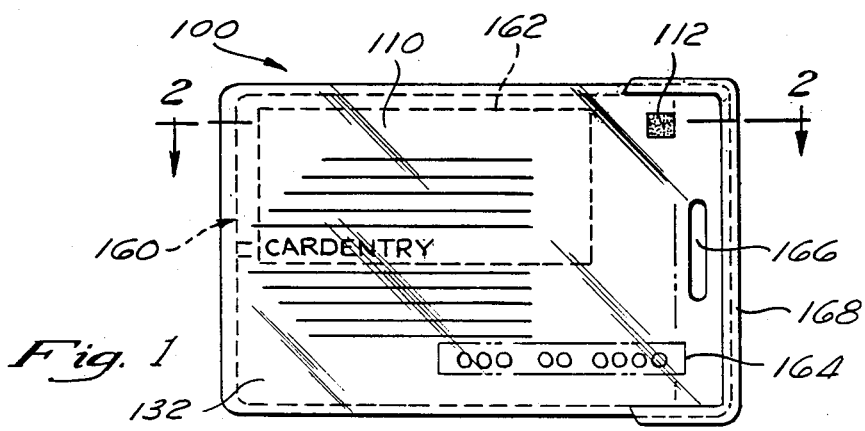

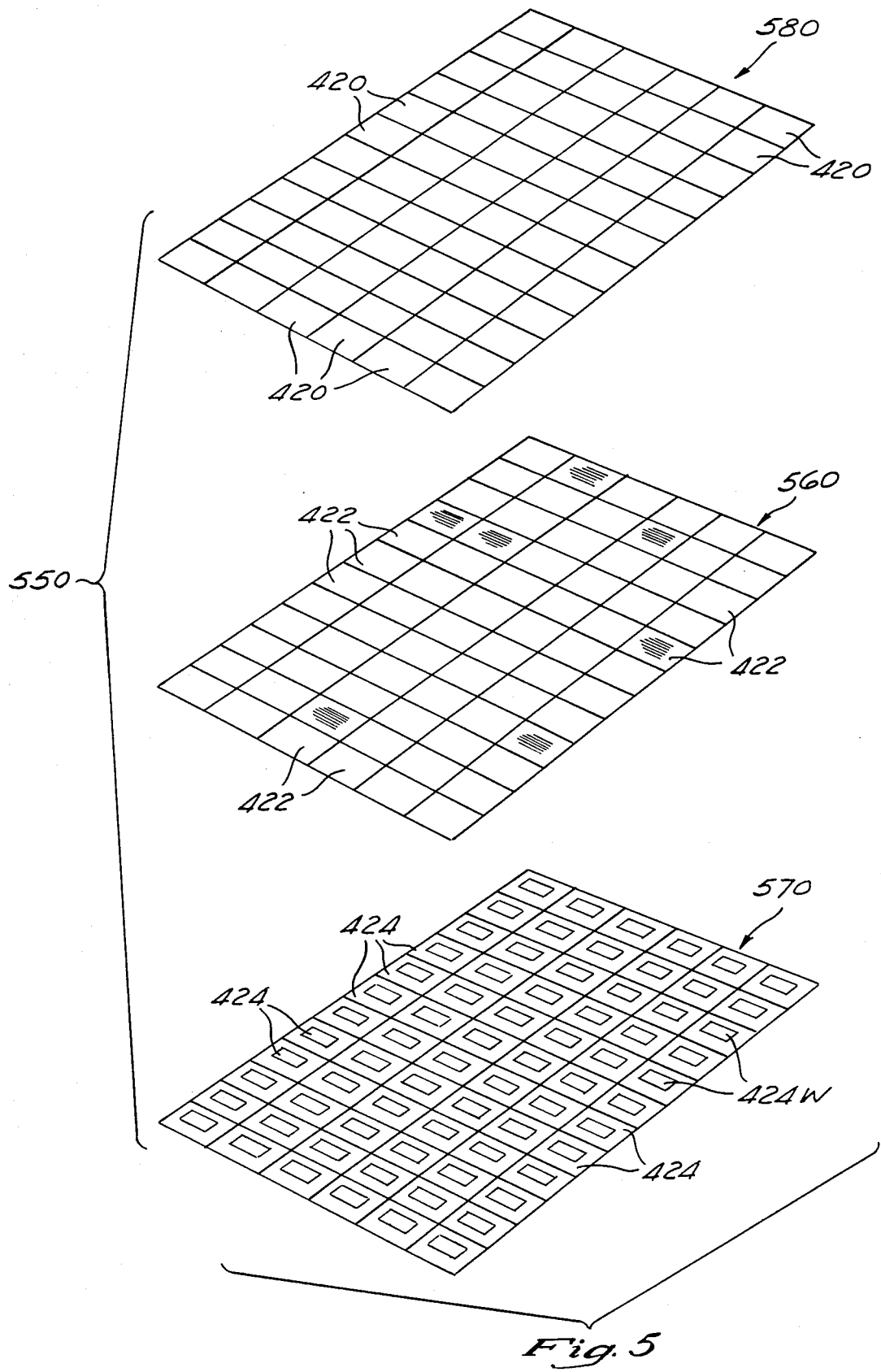

STRUCTURE AND METHOD OF MAKING COMBINATION PROXIMITY/INSERTION IDENTIFICATION CARDS

BACKGROUND OF THE INVENTION

This application relates to the field of identification cards for use in access control systems and, more particularly, to identification cards which are capable of being read by two or more different types of card readers.

Numerous types of identification cards are known in the access control field for storing identification data, and making this data available to card readers. The data may be placed on the cards in a variety of formats. One popular format uses a technology referred to as a magnetic stripe. In that format, the data is magnetically encoded sequentially along a strip of magnetic material on a card. Another format provides data which is magnetically encoded at selected locations on a magnetic material embedded within the interior of a card. In both the magnetic stripe and magnetic material cards, the data stored on the card is retrieved by inserting the card into a reader that senses the magnetic fields representative of the data. Magnetic field sensors for detecting the card data are typically housed within a structure having a slot or channel, which receives the card and aligns the magnetically encoded region of the card with the magnetic sensor portion of the reader.

As was suggested above, many access control systems for maintaining the security of controlled areas currently use identification cards having identification data magnetically encoded on the card. In these systems, authorized persons having valid identification cards may gain access to a secured area by inserting the magnetic card encoded with their identification data into a slot of a card reader. The magnetically encoded data on the card is read and sent to a system controller that processes the data, authorizes or refuses entry, and based thereon, signals the security system to either lock or unlock the door. This type of system is commonly referred to as an insertion system, since access is gained by inserting the identification card into a reader having magnetic field sensors. An example of such a system is described in U.S. Pat. No. 3,686,479 entitled "Static Reader System for Magnetic Cards." This patent and its disclosure are hereby incorporated herein by reference.

Also known in the access control field are identification tags or cards that contain electronic circuitry. The electronically stored data on these devices is often read remotely by means of radio-frequency transmission of signals between the identification card and a remote sensor. A common example of this type of identification device may also be found in clothing stores where the cards or tags are attached to the merchandise and a sensor is placed at an exit of the store. The sensor detects the identification card or tag if unauthorized removal of merchandise from the store is attempted. The electronically stored data on the card is read by positioning the card with respect to the sensor within a predetermined range and orientation. For example, in one typical application, the card may be read by the sensor if it is brought to within 12 inches of, and substantially parallel to, the front surface of the sensor.

Many access control systems incorporate this type of proximity card for use in maintaining the security of controlled areas. To gain access to a secured area with such an electronically encoded card, an authorized user need only present the card to a proximity sensor as previously described. The electronically encoded data on the card is communicated to the sensor by means of radio-frequency signals that propagate through the space separating the card and sensor. The card does not need to be physically inserted into the sensor. In other words, access may be gained merely by waving or placing the card in the general vicinity of the sensor as opposed to physically inserting the card into a specific slot or channel on the sensor. These types of sensors are known as proximity readers.

Since the proximity sensor and identification card do not have to physically touch one another in order to retrieve the identification data from the card, proximity sensors may be located in concealed locations. For example, the sensor may be embedded in or behind a wall. Thus, proximity sensors may be installed so that they are protected from outdoor weather conditions. Remote mounting further prevents vandals from tampering with the sensors. One example of a proximity system utilizing radio-frequency communication between an electronically encoded card and a remote sensor is described in U.S. Pat. No. 4,506,148 entitled "Identification Card." This patent and the disclosure therein are hereby incorporated herein by reference.

Prior to the advent of proximity access control systems, made possible by miniaturized electronics capable of being mounted in a card, most access control systems were of the insertion type described above. The insertion type systems have remained popular, and are often used when a facility which already has an insertion system is enlarged or expanded, since the compatible technology avoids problems of having insertion as well as another type of system on the same premises. However, proximity systems have also become quite popular and are often installed in new facilities which do not have any other types of access control systems.

In today's active business world where acquisitions and mergers are an everyday phenomenon, it is not unusual for a business to suddenly end up owning one facility having an insertion type access control system and another facility having a proximity type access control system. This can create problems for those individuals needing access to each of those facilities. Specifically, such an individual is forced to carry at least two identification cards, one for use in the insertion system and another for use in the proximity system. Of course, this is not only an inconvenience for the individual, but also can be a rather substantial expense for the business if there are a large number of persons needing access to both facilities. For each such individual, the business must bear the expense of providing and maintaining inventory and security control of at least two cards containing substantially identical information.

Based on the above, it would be an important improvement in the technology to provide a single card which could be used to obtain access to facilities having either insertion or proximity access control systems. It would be a further improvement in the technology to provide such a card which could be used in presently existing insertion card readers. It would be a still further improvement in the technology to provide a method of producing such a card combining the magnetic storage medium of an insertion card with the electronic storage capability of a proximity card, while minimizing interference between the two contrasting yet complementary storage and retrieval technologies.

SUMMARY OF THE DISCLOSURE

The identification card of the present invention overcomes the obvious inconvenience experienced by those individuals having to carry two identification cards by combining, in a single identification card, insertion data storage medium with proximity data storage medium. The present invention also overcomes the difficulties inherent in producing a combination identification card resulting in a combination insertion/proximity identification card which is compatible with existing insertion and proximity sensors.

In particular, the present invention is directed to a structure for identification cards and a method of producing identification cards that combines two or more data storage technologies on one card while maintaining the configuration of the card such that it is compatible with the existing hardware of both technologies. The identification card of the present invention comprises a combination of card technologies, including a proximity system having electronic circuitry configured in card format and an insertion system having permanent data storage in the form of magnetic materials embedded in or attached to the card.

BRIEF DESCRIPTION OF THE DRAWINGS

FIG. 1 is a top plan view of a dual technology card illustrating the locations of the magnetic data storage material and the electronic circuitry for electronic data storage.

FIG. 4 shows an exploded view of a combination proximity/insertion identification card with photo identification.

FIG. 5 is an exploded view of the insertion card subassemblies illustrating simultaneous manufacture of 72 such subassemblies.

FIG. 6 shows an exploded view of a combination proximity/insertion identification card without photo identification.

DETAILED DESCRIPTION OF THE PREFERRED EMBODIMENT

Figure 2:
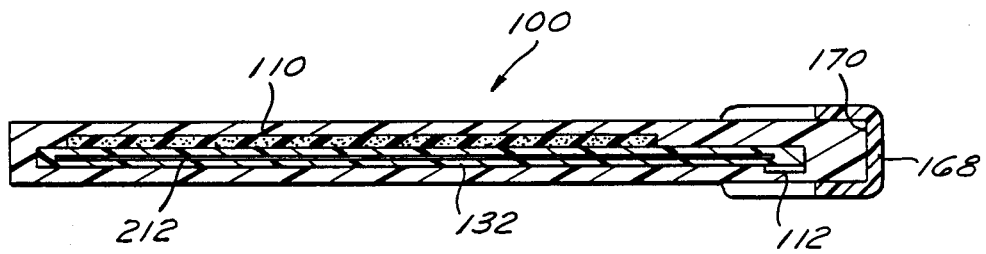
FIG. 2 is a cross-sectional view of the dual technology card shown in FIG. 1.

A preferred embodiment of the invention, shown in FIG. 1, illustrates a top plan view of a dual technology identification card 100 and shows the location of a proximity insert 132 within the card 100 by phantom line 160 and the location of a magnetic material insert 110 by phantom line 162. The location of legible, embossed characters is indicated by the phantom line 164. An integrated circuit 112 contains the electronic storage medium portion of the proximity insert 132.

A slot 166 may be cut through the card 100 at a location which avoids the magnetic material 110 and the proximity insert 132 to accept straps and clips for attaching the card 100 to clothing and the like. The edges of the card near the slotted end may also be reinforced by installation of an edge guard 168. The edge guard 168 has a channel on the inner surface into which the edge of the card 100 is inserted. Once in position, the edge guard 168 may be bonded in placed by an adhesive or chemical bond.

Shown in FIG. 2 is a cross-sectional view of the identification card 100 in FIG. 1 as seen along lines 2—2. Illustrated are the relative positions of the magnetic material insert 110, the proximity insert 132, the integrated circuit 112, and an antenna 212 within the body of the card 100. The edge guard 168 is mounted on the card 100 by sliding the card line into a channel 170 of the guard 168.

In a preferred embodiment, the proximity insert 132 is an IDI (Identification Devices, Inc.) part number 660-0029-080 proximity insert. The proximity insert 132 comprises the antenna 212 distributed through at least portions of the body of the proximity insert 132 and integrated circuit chip 112.

Figure 3A:
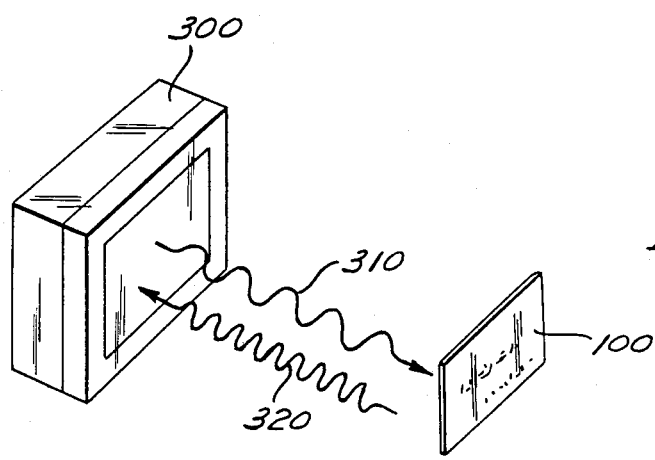
FIG. 3a shows how a typical proximity sensor communicates with a proximity card.

FIG. 3a shows how a typical proximity sensor 300 communicates with the proximity insert portion 132 (FIG. 2) of the card 100. Referring to both FIGS. 2 and 3a, the use of the card 100 with the proximity sensor 300 can be more fully described. Specifically, proximity sensor 300 transmits a radio frequency signal 310 which is received by the antenna 212. The electronic circuitry converts the radio frequency signal 310 into power for integrated circuit chip 112. Once powered, chip 112 transmits identification data stored electronically in the chip 112 back to the sensor 300 by means of a radio frequency signal 320. Antenna 212 may also be used to transmit the signal 320 from the card 100. The sensor 300 processes signal 320 containing the identification data and transmits the data to the central controller of the access control system as described previously.

Figure 3B:
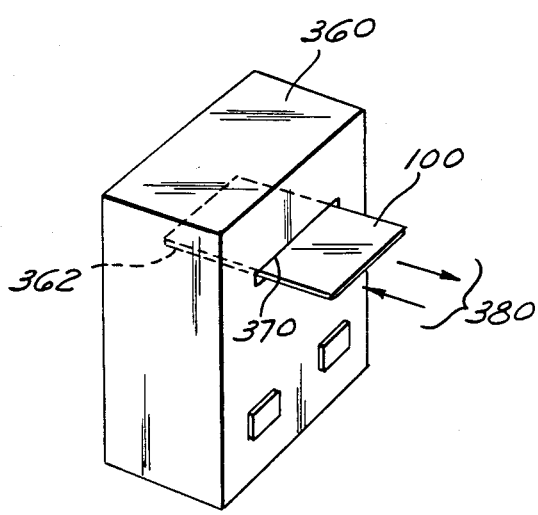
FIG. 3b shows how a typical insertion reader obtains data from a magnetically encoded identification card.

A typical insertion reader 360 is shown in FIG. 3b with card 100 positioned within the reader slot 370. Magnetic sensors 362 located inside the reader 360 and positioned adjacent the magnetic material portion 110 (FIG. 2) of card 100 detect identification data magnetically encoded on magnetic material 110. Arrows 380 indicate the motion of the card 100 when being inserted and removed from slot 370. In the preferred embodiment, the magnetically encoded data is read while the card 100 is stationary within slot 370. However, it will be understood that magnetically encoded data may also be detected while the card 100 is in motion relative to slot 370 and the magnetic sensors 362 inside slot 370.

The magnetically stored data is stored in an array of magnetized spots on the thin sheet of barium ferrite material 110. The magnetic data is read from the card 100 by inserting the card 100 into a reader 360 having electromagnetic sensors 362 that detect the polarity of the magnetized spots and convert the magnetic data to electrical data. The electrical data is transmitted to an access control system (not shown), where it is processed using conventional data processing techniques. Such an access control system is described in detail in the above-referenced U.S. Pat. No. 3,686,479.

In addition to the magnetic storage of data, the preferred embodiment incorporates proximity technology wherein identification data is electronically stored on the card 100 in an integrated circuit chip 112. The data storage portion of the integrated circuit chip 112 may comprise any of a number of nonvolatile digital electronic storage devices such as Read Only Memories (ROM), Programmable Read Only Memories (PROM), or Erasable Programmable Read Only Memories (EPROM). The data stored in the integrated circuit chip 112 is transmitted to a sensor portion 300 of the access control system by means of radio-frequency signals 320 that propagate through the air from the identification card 100 to the sensor 300. The proximity sensor 300 receives and communicates the data to the main controller (not shown) of the access control system. Typically, the radio-frequency signals 320 modulated by the electronic identification data are transmitted from the identification card 100 by means of an antenna 212 embedded in the card 100. The sensor portion 300 of the proximity access system also has an antenna (not shown) for receiving and transmitting the radio-frequency signals 310, 320. Electrical power for processing and transmitting the electronic data on the identification card 100 may either be provided by a battery (not shown) located on board the card 100 or, preferably, it may be obtained from a radio-frequency signal 310 transmitted from the sensor 300 to the identification card 100. In the latter case, the radio-frequency signals 310 received by the identification card 100 are detected by an antenna 212 on the card 100 and rectified and conditioned by additional electronics on the card 100 to provide power to the data storage and transmission electronics 112 on the card 100. A battery powered identification card is described in U.S. Pat. No. 4,353,064 entitled "Battery Operated Access Control Card." A radio-frequency powered system is described in U.S. Pat. No. 4,546,241 entitled "Electronic Proximity Identification System." Both of these patents are hereby incorporated herein by reference.

An exploded view of a preferred embodiment of the identification card 100 is shown in FIG. 4. This embodiment incorporates magnetic storage of identification data using barium ferrite material 110 and electronic storage of identification data using integrated circuit chip 112. As shown in FIG. 4, the overall configuration of the dual technology identification card 100 is that of a stacked plurality of layers, wherein adjacent layers are bonded together. Typical dimensions of the dual technology identification card 100 are 2⅛ inches by 3⅜ inches with a maximum card thickness of less than about 0.060 inches, and preferably about 0.057 inches or less. In a preferred embodiment, layer 420 is a transparent or semitransparent overlay which is about 0.002 inches thick, made of polyvinylchloride, PVC. Layer 422 is a piece of about 0.005 inch thick PVC on which desired printed or pictorial information, such as facility logo or user instructions may be printed. Layer 424 is a piece of about 0.011 inch thick PVC in which a window 424w is cut to receive a strip of magnetic material 110. The strip of magnetic material 110 is substantially the same size as the window 424w and has a thickness of approximately 0.010 inches, which closely matches the thickness of the layer 424. The magnetic strip 110 is typically formed of a barium ferrite material distributed throughout a flexible rubber-like base. Sheets of such flexible, permanent magnet barium ferrite material are readily available from B. F. Goodrich Company.

Layer 426 is a piece of double-sided contact adhesive material which is about 0.002 inches thick. One such adhesive is sold by 3M Corporation under the tradename of Scotch 9470. Layer 428 is a piece of about 0.015 inch thick PVC having a window 428w sized such that a proximity electronic data storage device 132 will fit into the window 428w.

Layer 430 is a piece of about 0.004 inch thick double-sided contact adhesive material having a window 430w which is also sized to receive the proximity device 132. Layer 434 is a photograph having a typical thickness of approximately 0.010 inches, and a length and width substantially equal to or less than the length and width of the proximity device 132. Layer 436 is a sheet of about 0.0035 inch thick triacetate film.

One method of assembling the identification card 100 shown in FIG. 4 is as follows. Card subassemblies 450 comprising overlay 420, printed layer 422, barium ferrite window layer 424 and barium ferrite strip 110 are assembled in quantity using a technique similar to that described in U.S. Pat. No. 3,811,977 entitled "Structure and Method of Making Magnetic Cards," assigned to the assignee of the present invention and hereby incorporated herein by reference. In a manner similar to that described therein, and illustrated in FIG. 5, 72 separate card subassemblies 450 comprising layers 420, 422, 424 and 110 may be produced simultaneously in one large sheet 550. The large sheet 550 contains twelve rows with six card subassemblies 450 in each row.

In operation of the assembly method, a large sheet 560 comprising 72 printed layers 422 is heat sealed to a large sheet 570 comprising 72 window layers 424 so as to properly align the windows 424w with the printed layers 422. A large sheet 580 comprising 72 clear overlay sheets 420 is applied over the large sheet 560 of printed layers 422 by heat sealing to the top of the large sheet 560 of printed layers 422. The 72 non-magnetized barium ferrite inserts 110 are then inserted into the 72 rectangular windows 424w in large window sheet 570.

The entire large sheet 550 of 72 insertion card subassemblies 450 is placed into a conventional laminator (not shown). The large sheet of subassemblies 550 is laminated by bringing the temperature of the subassemblies 550 up to approximately 300° F. over a predetermined period of time, for example 7–9 minutes, at which point heating is discontinued and the fused sheet of subassemblies is returned to room temperature over a predetermined period, for example 5–7 minutes. Pressure on the laminator is approximately 120 tons psi, depending upon the number of layers and the number of cards on the sheet. Heating and cooling times will vary in accordance with the number of large sheets and the number of colors of ink on the printed layers 422. Thus, for a particular arrangement, it may be necessary to vary the specific heating and cooling cycle from that described above.

Equipment used for the laminating process may comprise a conventional steam press (not shown) with platens between which the stacks of large sheet subassemblies 550 to be fused are placed between polished chrome plates as in forming conventional credit cards. It has been found advantageous to insert a sheet of Teflon material under the large sheet 570 and inserts 110 to prevent adhesion of the barium ferrite insert 110 to the plates of the laminator.

Once laminated, the large sheet of subassemblies 550 is cut into twelve strips of six card subassemblies 450 each. The two-sided adhesive layer 426 is applied to the strips of six card subassemblies 450, thus forming six single insertion card subassemblies 460 comprising layers 420, 422, 424, 110 and 426, which are then cut from the strips of six insertion card subassemblies 460. The individual insertion card subassemblies 460 are trimmed to their finished dimensions and shaped by rounding the corners.

The insertion card subassembly 460 is magnetically encoded by magnetizing portions of the barium ferrite strip 110 in a spot pattern. The spots have a north or south polarity aligned perpendicular to the surface of the card. Accordingly, the card subassembly 460 is preferably inserted in a conventional encoder device (not shown) that is adapted to magnetize all such spots without changing the position of the card. As desired, all cards may have the same polarity distributions, i.e., have the same code, or each may be coded differently than all others by virtue of a polarity distribution of the spots on each magnetic strip 110 that is different from all others.

In a preferred embodiment, the insertion card subassembly 460 may be embossed with legible identification characters. The raised characters may be tipped in a variety of colors to enhance their appearance and readability. This feature also contributes to the overall security of the cards by making unauthorized duplication quite difficult.

A second strip of six subassemblies 470 comprising layers 428 and 430 is formed from a sheet of about 0.015 inch thick PVC bonded to a similarly-sized strip of double-sided adhesive. Six subassemblies 470 each comprising layers 428 and 430 with windows 428w and 430w are die-cut to final dimensions from this strip of PVC bonded to adhesive. The corners of the individual subassemblies 470 are rounded and the windows 428w, 430w are cut simultaneously when the subassembly 470 is trimmed to final dimensions.

Subassemblies 460 and 470 are assembled so that layer 426 of subassembly 460 is adjacent to layer 428 of subassembly 470. The proximity insert 132 is placed within the windows 428w and 430w so that the integrated circuit 112 is adjacent layer 434. Adhesive layer 426 bonds the proximity insert 132 to the combination of subassemblies 460 and 470.

For a photograph identification card, the photograph 434 is placed over the proximity insert 132 with the back side of the photograph 434 adjacent the proximity insert 132. The transparent triacetate layer 436 covers the photograph 434 front surface and is bonded to layer 428 by the adhesive layer 430. Additionally, the front surface of the photograph 434 may be bonded to layer 436.

FIG. 6 illustrates a non-photograph version of the combination insertion/proximity card 100. The non-photograph version of the card comprises the same subassemblies 460 and 470 as the photograph version plus a bottom print layer 610 and bottom transparent overlay 620.

The bottom print layer 610 is fused with transparent overlay 620 in the same manner described previously regarding the bonding of layers 420, 422, 424, and 110. Fused layers 610 and 620 are bonded to the combination of subassemblies 460 and 470 by means of adhesive layer 430, thus completing the assembly of the non-photograph version of the identification card 100 shown in FIG. 6.

It will be understood by those skilled in the art that the double contact adhesive layers 426 and 430 may be replaced by other bonding means, including but not limited to chemical bonding, fusion bonding, and ultrasonic bonding.

Although the invention has been described in terms of a preferred embodiment, it will be apparent to those skilled in the art that numerous modifications can be made without departing from the spirit and scope of the claims appended hereto. Such modifications are intended to be included within the scope of the claims.

What is claimed is:

1. An identification card, comprising:
   electronic circuitry which communicates with a remote sensor by means of electromagnetic signals propagating in space between said sensor and said card; and
   a magnetic data storage medium wherein data is stored on said medium in a matrix format and is sensed by a reader which detects said stored data.

2. An identification card as defined in claim 1, wherein said electronic circuitry comprises an antenna and an integrated circuit chip.

3. An identification card as defined in claim 1, further comprising means for optically encoding data on said card.

4. An identification card as defined in claim 1, wherein said card has a dimensional thickness which is no greater than about 0.060 inch.

5. An identification card, comprising:
   an antenna;
   electrical circuitry for storing data and generating electrical signals for transmission by said antenna; and
   a magnetic data storage medium for permanent storage of data encoded in matrix format wherein said matrix format data is detected by a card reader sensing element which remains stationary with respect to said storage medium while reading said data.

6. An identification card as defined in claim 5 wherein said antenna comprises both a receiving antenna and a transmitting antenna.

7. An identification card as defined in claim 5, wherein said electrical circuitry comprises an integrated circuit chip.

8. A method of manufacturing data cards comprising the steps of:
   forming a first subassembly comprising an outer layer and an inner layer wherein a portion of said inner layer is removed to form a window therein;
   inserting a layer of magnetic material into said window of said inner layer;
   forming a second subassembly comprising an antenna and integrated circuit chip; and
   joining said first subassembly with said second subassembly so that said layer of magnetic material is sandwiched between said outer layer and said second subassembly.

9. The method as defined in claim 8, further comprising the step of bonding a photograph to said joined first and second subassemblies.

10. The method as defined in claim 8, wherein said first and second subassemblies are bonded together with an adhesive material.

11. The method as defined in claim 8, wherein said first and second subassemblies are chemically bonded together.

12. The method as defined in claim 8, wherein said first and second subassemblies are ultrasonically bonded together.

13. An identification card comprising:
    a first structural layer;
    a second structural layer;
    electronic circuitry which provides an electronic signal defining first selected data; and
    magnetic material sandwiched between said first structural layer and said second structural layer, said magnetic material containing second selected data encoded in array format which data is detected by a sensor when said magnetic material is in stationary adjacent with said sensor.

14. An identification card as defined in claim 13 wherein said first and second selected data comprise the same data.

15. An identification card as defined in claim 13 wherein said electronic circuitry comprises an antenna and an integrated circuit chip.

16. An identification card comprising:
means for providing an electromagnetic signal defining first selected data; and
means for storing second selected data in a magnetic matrix configuration such that said second selected magnetic matrix data is detected by a sensor when said means for storing is in stationary adjacent alignment with said sensor.

17. A multilayered identification card comprising:
a transparent plastic overlay layer;
a printed layer of plastic;
a first plastic window layer defining a first window therein;
a strip of magnetic material sized to fit within said first window;
a first layer of adhesive material;
a second plastic window layer defining a second window therein;
a second layer of adhesive material defining a third window therein;
a plastic insert comprising an antenna and an integrated circuit chip, said insert sized to fit within said second and third windows;
a photograph; and
a transparent protective layer for said photograph.

18. A multilayered identification card comprising:
a first transparent plastic overlay layer;
a first printed layer of plastic;
a first plastic window layer defining a first window therein;
a strip of magnetic material sized to fit within said first window;
a first layer of adhesive material;
a second plastic window layer defining a second window therein;
a second layer of adhesive material defining a third window therein;
a plastic insert comprising an antenna and an integrated circuit chip, said insert sized to fit within said second and third windows;
a second layer of plastic; and
a second transparent plastic overlay.

19. A method of manufacturing data cards comprising the steps of:
assembling in stacked fashion a first subassembly comprising a top structural layer, a first window layer defining a first window and a magnetic layer positioned within said first window;
applying heat and pressure to said stacked first subassembly to bond said top structural layer, first window layer and magnetic layer together;
bonding a second window layer defining a second window to said first window layer/magnetic layer side of said bonded first subassembly;
inserting an electronic layer into said second window;
bonding said electronic layer in said second window; and
bonding a bottom structural layer to said second window layer/electronic layer.

20. A method of manufacturing data cards as defined in claim 19 further comprising the step of sandwiching a photograph layer between a bottom transparent outer layer and said bottom structural layer.

21. An identification card, comprising:
electronic circuitry which communicates with a remote sensor by means of electromagnetic signals propagating in space between said sensor and said card; and
a magnetic data storage medium wherein data is stored on said medium in an array format such that said array format data is detected by a card reader sensing element which remains stationary with respect to said storage medium while reading said stored data.

22. An identification card as defined in claim 21 further comprising a top structural layer and a bottom structural layer wherein said magnetic data storage medium is sandwiched between said top structural layer and said bottom structural layer.

23. An identification card as defined in claim 1 further comprising a top structural layer and a bottom structural layer wherein said magnetic data storage medium is sandwiched between said top structural layer and said bottom structural layer.

24. An identification card as defined in claim 1 wherein said matrix format data is detected by a sensing element of said reader which remains stationary with respect to said storage medium while reading said stored data.

25. An identification card, comprising:
first electronic circuitry which communicates with a remote sensor by means of electromagnetic signals propagating in space between said sensor and said card; and
second electronic circuitry connected to electrical contacts which are accessible from the card surface.

26. An identification card as defined in claim 25, wherein said first electronic circuitry and said second electronic circuitry share components.

* * * * *